(No Model.)
J. J. SHENK.
NEWSPAPER FILE.
No. 466,143. Patented Dec. 29, 1891.
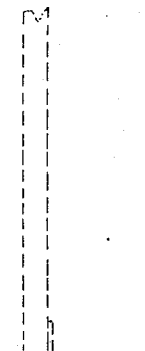
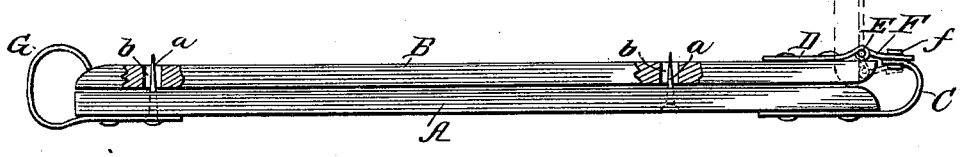
Fig. 1.
Fig. 2.
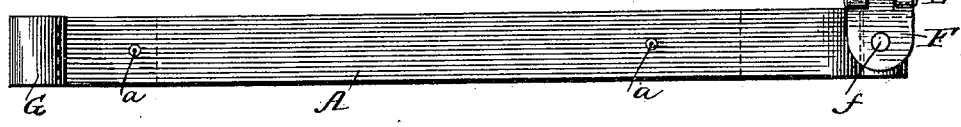
Fig. 3.
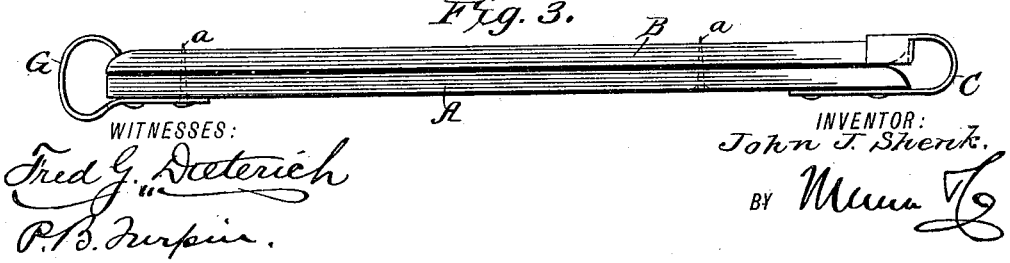
WITNESSES:
Fred G. Dieterich
P. B. Turpin
INVENTOR:
John J. Shenk.
BY Munn &Co
ATTORNEYS

UNITED STATES PATENT OFFICE.

JOHN J. SHENK, OF BURKITTSVILLE, MARYLAND.

NEWSPAPER-FILE.

SPECIFICATION forming part of Letters Patent No. 466,143, dated December 29, 1891.

Application filed January 15, 1891. Serial No. 377,878. (No model.)

*To all whom it may concern:*

Be it known that I, JOHN J. SHENK, of Burkittsville, in the county of Frederick and State of Maryland, have invented a new and useful Improvement in Newspaper-Files, of which the following is a specification.

My invention is an improved file intended especially for newspapers; and it consists in certain novel constructions and combinations of parts, as will be hereinafter described, and pointed out in the claims.

In the drawings, Figure 1 is a side view of the file closed in full lines, partly broken away to show the slots in the upper bar, and having said upper bar shown in dotted lines in vertical position. Fig. 2 is a top plan view of the file, the top bar being shown as turned to one side; and Fig 3 shows a somewhat different construction from that shown in Figs. 1 and 2.

The file is shown as formed with the bars A and B, which may, for convenience of reference, be termed, respectively, the "lower" and "upper" bars. The lower bar A has pins $a$, which project into slots $b$ in the upper bar B.

Referring to the construction shown in Figs. 1 and 2, the bar A has secured to it at one end a spring-plate C, which curves up from one end of the bar A to about the plane of the upper side of the bar B. To the upper bar B is secured one strap D of a hinge E, the other strap F of which is pivoted at $f$ to the spring C near the free end of the said spring. This pivot is so arranged that the bar B may be swung laterally to one side to facilitate the application of the papers to and their removal from the file.

It is manifest that instead of pivoting the strap F to the spring C such strap might be fixed with respect to the spring and the strap D of the hinge be pivoted to the bar B; but I prefer the arrangement shown in Fig. 1, because it adapts the file to secure a long paper more conveniently than the modified arrangement described.

When desired, the bar B, instead of being turned laterally to one side, as shown in Fig. 2, may be raised vertically to the right-angled arrangement shown, and when adjusted to such position will be held therein by the tension of the spring C. It will also be understood that the upper bar may be laid back horizontally in a line with the lower bar.

It is obvious that the device may be used in the manner last described without the pivot $f$; but such pivot is much to be preferred, because it enables the bar B to be swung to one side, when desired.

In Fig. 3 I show a somewhat different construction from that shown in Fig. 1. In such Fig. 3 I use the spring C; but instead of connecting it by a hinge with the bar B, I form such spring C with a socket or seat-like portion at its free end, in which the end of the bar B is placed and held. At their opposite ends the bars A B are held together by the spring G. This spring is a plate secured at one end to the bar A and curving up from the end of said bar A and arranged at its free end to engage upon the end of the bar B. At its free end the spring C curves downward, so that the bar B may be pressed past the end of the spring in being forced to closed position and yet will be held in such closed position by the end of the spring bearing firmly upon the upper side of the bar. To release the bar B from spring C, the end of the spring may be pressed back past the end of the bar B to permit the latter to be lifted off the pins $a$. In use the bars may be opened and the paper pressed upon the pins and the bar B be then closed upon such papers and pins and secured by the spring G in the manner described.

Having thus described my invention, what I claim as new is—

1. A paper-file substantially as described, comprising two bars, one having pins and the other openings to receive the same, devices for holding these two bars together at one end, and the spring-plate G, secured at one end to one of such bars and curving up over and arranged to bear at its free end upon the other bar, the said spring-plate being arranged to yield at its free end in the direction of movement of the bar it secures, whereby it may be self-adjusting to adapt the file to properly hold different thicknesses of paper, all substantially as set forth.

2. In a paper-file, the combination of the bars A and B, one having pins and the other having openings to receive the same, the spring C, secured at one end to one of said bars, and a hinge connecting the said spring C with the other bar, and devices connecting the opposite ends of the bars, all substantially as set forth.

3. The improved paper-file, substantially as herein described and shown, comprising the bar A, the spring C, secured at one end to such bar A, the bar B, held at one end to the spring C, and devices for securing the opposite ends of bars A and B together, said bars A B being adapted between their ends to receive newspapers, all substantially as and for the purposes set forth.

4. The combination, with the bars A and B, of the spring C and the hinge connecting the spring C and bar B, and pivoted substantially as set forth.

5. The improved paper-file, substantially as shown, consisting of the bars A and B, having pins $a$ and openings $b$, the spring C, the hinge connecting the plate C and bar B and pivoted, substantially as described, and the spring G, all substantially as and for the purposes set forth.

JOHN J. SHENK.

Witnesses:
JOHN W. HILLEARY,
DAVID E. HILLEARY.